United States Patent [19]
Grob et al.

[11] Patent Number: 5,574,773
[45] Date of Patent: Nov. 12, 1996

[54] METHOD AND APPARATUS OF PROVIDING AUDIO FEEDBACK OVER A DIGITAL CHANNEL

[75] Inventors: Matthew S. Grob, San Diego; Gadi Karmi, Del Mar; Robert H. Kimball, San Diego, all of Calif.

[73] Assignee: Qualcomm Incorporated, San Diego, Calif.

[21] Appl. No.: 200,028

[22] Filed: Feb. 22, 1994

[51] Int. Cl.⁶ ........................................ H04B 7/00
[52] U.S. Cl. ........................ 379/59; 379/58; 455/33.1
[58] Field of Search ........................ 379/58, 59, 63, 379/97, 98, 100; 375/222; 455/33.1, 54.1

[56] References Cited

U.S. PATENT DOCUMENTS

| | | | |
|---|---|---|---|
| 5,121,391 | 6/1992 | Paneth et al. | 379/59 |
| 5,287,551 | 2/1994 | Gustafson, Jr. et al. | 379/63 |
| 5,479,480 | 12/1995 | Scott | 455/33.1 |

FOREIGN PATENT DOCUMENTS

| | | | |
|---|---|---|---|
| 2032663 | 2/1990 | European Pat. Off. | H04M 11/00 |
| 9200177 | 6/1992 | WIPO | H04M 11/06 |

OTHER PUBLICATIONS

*Interoperable Wireless Data* David Weissman et al. IEEE Communications Magazine Feb. 31, 1993.

*Primary Examiner*—Edward L. Coles, Sr.
*Assistant Examiner*—Fan Lee
*Attorney, Agent, or Firm*—Russell B. Miller; Katherine W. White

[57] ABSTRACT

Providing an audible feedback feature giving the user the ability to audibly monitor the progress of a data connection over a digital wireless channel. Audible tones generated within a base station and received from a telephone network are encoded within the base station and transmitted over the digital wireless link to a mobile unit. The mobile unit decodes the signal received from the base station and provides the audible tones to a user. The user can thus monitor the success or failure of the data connection.

34 Claims, 5 Drawing Sheets

METHOD AND APPARATUS OF PROVIDING AUDIO FEEDBACK OVER A DIGITAL CHANNEL

BACKGROUND OF THE INVENTION

I. Field of the Invention

The present invention relates to communication. More particularly, the present invention relates to a novel and improved method and apparatus for providing communication over a digital link.

II. Description of the Related Art

A variety of apparatus exists today that use standard telephone networks to convey data from one terminal to another. One of the most common terminals that uses a standard telephone network to convey data is the facsimile (FAX) machine. Like other terminal equipment that use standard telephone networks, a FAX machine uses a modem to translate digital information to audible analog tones for transmission over the telephone network. At the receiving FAX machine, a modem is used to convert the tones back into an estimate of the original digital information sent by the transmitting FAX machine.

With the deployment of cellular and personal communications wireless systems, the end user may wish to connect his terminal equipment to a mobile communications device instead of directly to a land telephone network. If the end user attempts to send the audible tones produced by a modem over a standard digital wireless channel, it is doubtful that he will be successful. Digital wireless communication equipment typically uses vocoders to convert incoming voice signals into digital bits for transmission over the channel. Vocoders are tailored to sample and compress human voice. Because modem tones differ significantly from human voice, the vocoder can cause critical degradation to the modem tones. Also, maximizing the capacity of the system in terms of the number of simultaneous users that can be handled is extremely important in a system using a wireless link. Digitizing modem tones with a vocoder and sending them over the digital wireless link is an inefficient use of the radio channel.

A more efficient, flexible, and reliable transmission means is to provide a mechanism to transmit the digital data over the digital wireless link directly. This configuration presents some unique opportunities to take advantage of the digital link to provide high quality service.

Just as the vocoder is not suited for the transmission of analog data tones, the digital data transmission circuitry is not suited for the transmission of voice. In standard modem setups that use analog data tones, the end user is able to listen to the tones received from the answering modem. This ability is especially important when the connection fails. Without the ability to listen to the returning signal, the end user may be unable to detect the cause of a failure to connect. Connection failures can occur in many ways including dialing the wrong number, temporary interruptions of service, connection to an out-of-service line, connection to a human answerer, or receipt of a busy signal. These types of occurrences are difficult for the modem itself to detect. Without the audible feedback feature, the end user may only know that the connection failed thus be unable to correct for the failure. The present invention abrogates this problem by providing an audible feedback feature to the mobile unit user which provides similar audible feedback available today with conventional modems.

It is therefore the object of the present invention to provide an efficient method and apparatus for providing a audible feedback feature during a data call.

It is a further object of the present invention to provide a means for monitoring the progress of the modem connection process.

SUMMARY OF THE INVENTION

The present invention is a novel apparatus and method of providing the ability to audibly monitor the progress of a data connection over a digitally encoded radio channel. The audible feedback feature is used over a digital connection such as a digital wireless link. The base station, upon receiving the initiation of a data connection, assigns a vocoder to listen to the analog signals produced from the connection process. The base station transmits the vocoded analog signals to the mobile unit. The mobile unit processes the received vocoded analog signals to provide the analog signals to the mobile unit user.

Several enhancements and alternative embodiments allow an expanded use of the audible feedback feature. For instance, the received vocoded analog signal could be routed directly to the terminal equipment. The terminal equipment could house the decoding portion of a vocoder and a speaker. Also, for mobile units capable of simultaneous voice and data connections, the audible feedback feature could be disabled by the user if a voice call were in progress, or the voice could be automatically paused by the receipt of the vocoded analog signal, or the voice signal and the received vocoded analog signal could be added and output as a combined signal to the user.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
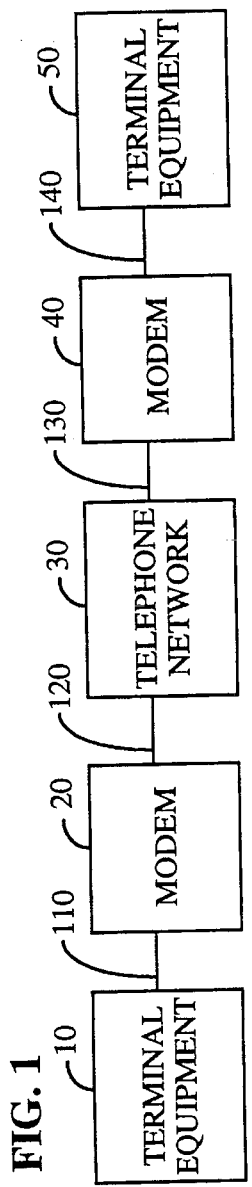
FIG. 1 is an apparatus that uses a standard telephone network to convey data from one terminal to another.

Several methods exist today that use a standard telephone network to convey data from one terminal to another. Terminals that connect by telephone networks can be FAX machines, personal computers, credit card verification machines, and telemetry devices. The standard connection of this type of devices is shown in FIG. 1. For example, assume terminal equipment 10 is transmitting information to terminal equipment 50. Terminal equipment 10 produces digital data 110 representative of the information. Modem 20 converts digital data 110 to analog signal 120. Analog signal 120 is of a proper bandwidth and power level to be transferable over standard telephone network 30. Telephone network 30 conveys analog signal 120 to its destination. The telephone network may introduce noise such that output analog signal 130 is an estimate of analog signal 120. Modem 40 converts analog signal 130 to digital data 140 that is an estimate of digital data 110. Terminal equipment 50 receives digital data 140 and can act on the estimate of the information sent by terminal equipment 10. Most such links are bi-directional with the reverse functions working in the same manner as the forward.

FIG. 1 is a simplified diagram. Actual implementations of these connections can take on a variety of forms. For example in some equipment, such as a standard FAX machines, the terminal equipment and the modem reside in the same housing. Also telephone network 30 may use any of a variety of methods well known in the art to convey analog signal 120 to its destination. Such methods may include digitizing the signal and transmitting the signal by satellite to a remote location where analog signal 130 is created.

Figure 2:
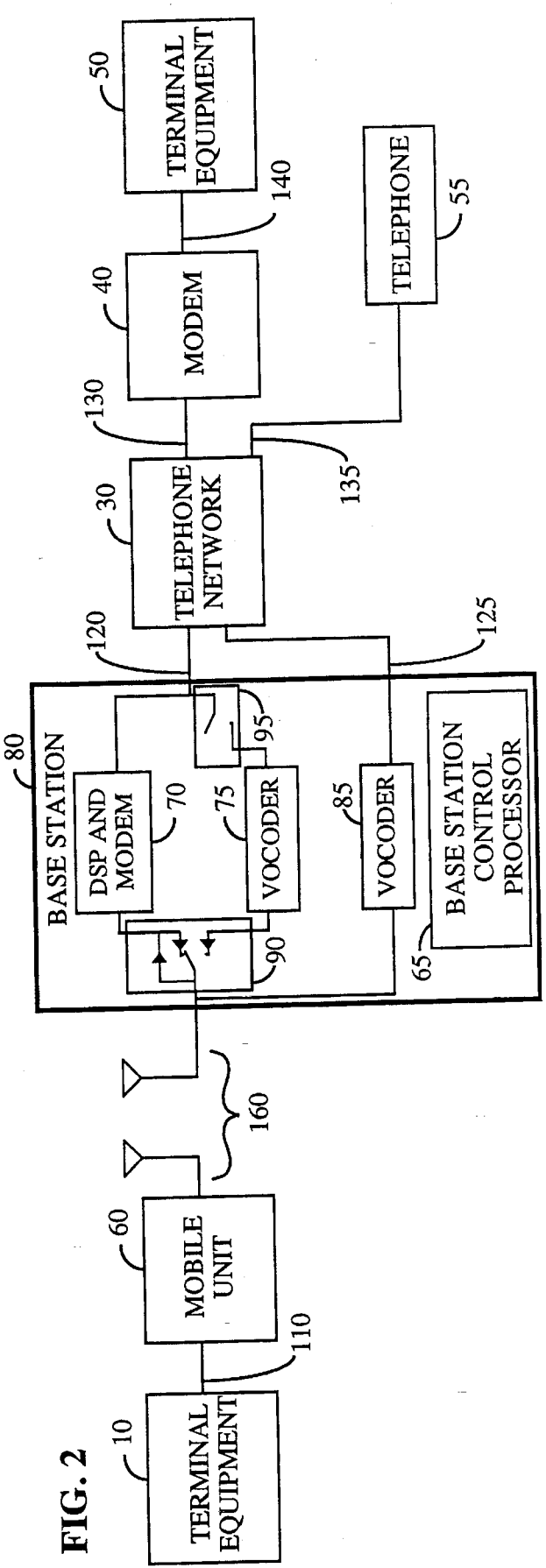
FIG. 2 is an apparatus that uses a standard telephone network and a digital wireless link to convey data from one terminal to another comprising a base station that provides the audible feedback feature.

A wireless link is introduced into the configuration of FIG. 1 when a user would like to connect his terminal equipment but does not have access to a land telephone network. The user may instead have a digital mobile communications device. FIG. 2 is an exemplary embodiment of such a configuration. In FIG. 2, modem 20 has been replaced with mobile unit 60, wireless link 160, and digital signal processor (DSP) and modem 70. DSP and modem 70 resides in base station 80 that could be a standard cellular or personal communication base station also capable of handling digital and analog voice communications. FIG. 2 assumes that just one of the connections between the terminal equipment and the telephone network has been replaced with a wireless link. The description that follows applies equally if communication is achieved with two wireless links.

Referring to FIG. 2, assume again that terminal equipment 10 is transmitting information to terminal equipment 50. Terminal equipment 10 produces digital data 110 representative of the information. Mobile unit 60 encodes digital data 110 and provides output over wireless link 160. The signal from wireless link 160 is received by base station 80 and DSP and modem 70. DSP and modem 70 converts the digital signal to analog signal 120 that is the same signal output by modem 20 in FIG. 1. Telephone network 30 conveys analog signal 120 to its destination. Telephone network 30 may introduce noise such that output analog signal 130 is an estimate of analog signal 120. Modem 40 converts analog signal 130 to digital data 140 that is an estimate of digital data 110. Terminal equipment 50 receives digital data 140 and can act on an estimate of the information sent by terminal equipment 10.

This link is bi-directional with the reverse functions working in the same manner as the forward. For example, terminal equipment 50 produces digital data 140. Modem 40 converts digital data 140 to analog signal 130. Telephone network 30 conveys analog signal 130 to base station 80 as analog signal 120. DSP and modem 70 recognizes the digital information contained in analog signal 120 and converts it to a digital format for communication over wireless link 160. Mobile unit 60 receives the incoming data signal and provides the corresponding digital data 110 to terminal equipment 10. The use of a digital wireless system to support communications with standard terminal equipment is disclosed in U.S. patent application Ser. No. 08/152,158 entitled "METHOD AND APPARATUS OF PROVIDING TIME SENSITIVE MESSAGE OVER A VARIABLE DELAY CHANNEL," filed Nov. 15, 1993, and assigned to the assignee of the present invention, the disclosure thereof incorporated by reference.

The functions of base station 80 are controlled by base station control processor 65. Base station control processor 65 controls DSP and modem 70, vocoder 75, vocoder 85, and switches 90 and 95. Assuming that mobile unit 60 is also a mobile telephone, if a user places a voice call, the user's voice is converted to digital form typically through vocoding and sent over wireless link 160 to base station 80. Within base station 80, the incoming voice call is directed to vocoder 85. Vocoder 85 decodes the voice signal and provides it as analog signal 125 to telephone network 30. Telephone network 30 conveys the signal to its destination and provides analog signal 135 to telephone 55. This link is also bi-directional with the reverse functions working in the same manner as the forward.

In FIG. 2, two vocoders are shown: vocoder 75 associated with audible feedback feature and vocoder 85 associated with voice communications. While they serve separate logical functions, in an alternative embodiment they could be the same physical device. The single vocoder could be selectively switched between the functions of standard voice service and the audible feedback feature.

Figure 3:
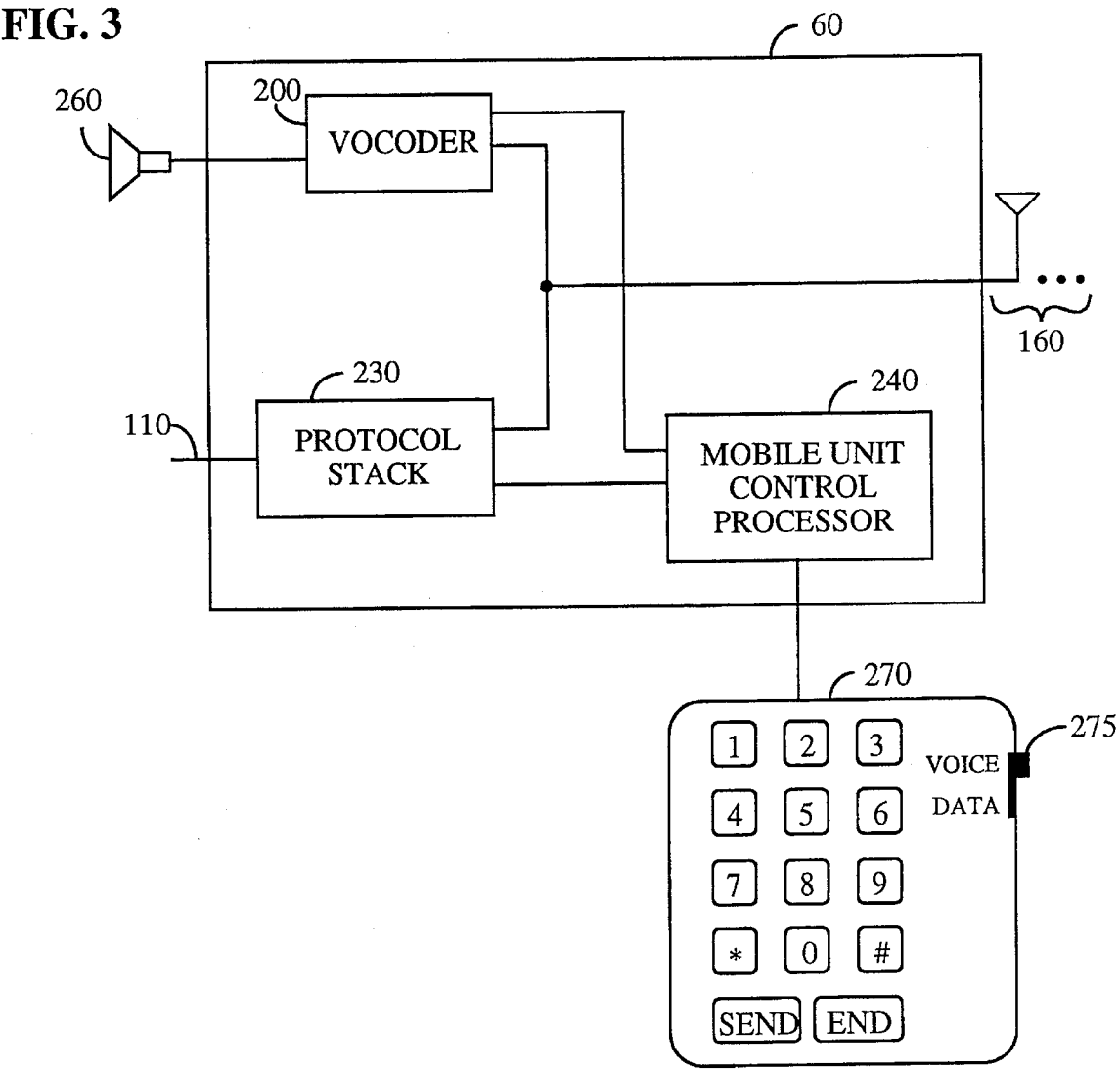
FIG. 3 shows an exemplary configuration of a mobile unit capable of providing simultaneous voice and data communications over a wireless link.

FIG. 3 shows a first embodiment of mobile unit 60 of FIG. 2. In FIG. 3, digital data 110 is coupled to protocol stack 230. Protocol stack 230 is capable of bi-directional communication with terminal equipment 10 and mobile unit control processor 240. When protocol stack 230 receives digital data 110 for transmission over wireless link 160, it provides any encoding required for transmission on wireless link 160. In the other direction, when a signal containing information for terminal equipment 10 arrives, protocol stack 230 provides any required decoding and passes it as digital data 110 to terminal equipment 10.

Likewise when vocoder 200 receives analog information from speaker/microphone 260 for transmission over wireless link 160, it encodes the information for transmission on wireless link 160. When a signal containing information for output on speaker/microphone 260 arrives on wireless link 160, vocoder 200 decodes the signal and provides audible output to speaker/microphone 260.

Mobile unit control processor 240 provides control over the functions of mobile unit 60. Information intended for mobile unit control processor 240 might come either over wireless link 160 or from digital data 110. Protocol stack 230 directs information intended for mobile unit control processor 240 to it. Protocol stack 230 may also receive commands and information for transmission over wireless link 160 or for digital data 110 from mobile unit control processor 240. Mobile unit control processor 240 also provides control functions for vocoder 200.

Protocol stack 230 provides the main control center for communication with terminal equipment 10 over wireless link 160. Protocol stack 230 must recognize and operate under a variety of protocols. Protocol stack 230 may provide flow control. Protocol stack 230 also packetizes and unpacketizes data. In addition, protocol stack 230 must recognize an array of special commands.

In a typical embodiment, protocol stack 230 exists on a microprocessor. Data input into protocol stack 230 from digital data 110 is encoded in a first protocol layer called the transport layer using a standard transmission control protocol that provides reliability over large blocks of data. From the transport layer, the data enters a network layer and is encoded in a standard internet protocol which provides addressing information to the data. From the network layer, the data enters the link layer. The link layer provides the radio link protocol which creates code redundancy checks (CRC) for each packet of data. The link layer controls the re-transmission of any packets of data that are corrupted during transmission over wireless link 160. From the link layer, the data enters the physical layer which provides modulation for transmission over the physical media which in this case is wireless link 160. Data from wireless link 160 is decoded by protocol stack 230 in the reverse order first entering the physical layer and continuing through the transport layer. A similar function, not shown, is performed within base station 80.

One factor that is apparent from the examination of FIG. 2 is that a voice connection is different from a data connection. Base station 80 must route an incoming call to DSP and modem 70 if it is a data connection and to vocoder 85 if it is a voice connection.

A problem can arise when non-data tone signals are input on analog signal 120 to DSP and modem 70. For example, assume that terminal equipment 10 attempts to contact terminal equipment 50 while terminal equipment 50 is involved in another call. Telephone network 30 provides a busy signal on analog signal 120. DSP and modem 70 may not recognize the busy signal as a valid data tone input and therefore has no information to send over wireless link 160. The user of terminal equipment 10 only knows that the connection failed. He does not know whether he dialed the wrong number, the line was busy, the number has been changed, or that a human answered. Such feedback is, of course, critical to identifying and correcting the problem encountered when a connection fails.

Recognition at base station 80 of non-data tone analog signals and communication of the information therein to mobile unit 60 is a complicated and inadequate solution to this problem. For example if DSP and modem 70 were to attempt to recognize a busy signal, it would have to be capable of decoding a variety of different signals because the busy signal is not an internationally standardized signal. Recognition of voice would be even more difficult.

A solution to the problem is shown in FIG. 2 within base station 80. When terminal equipment 10 seeks to establish a connection with terminal equipment 50, it sends a set of commands to DSP and modem 70 through mobile unit 60 and wireless link 160. The commands designate the telephone number of the receiving unit, transfer protocol, and modem setup information. Once the command is transferred, DSP and modem 70 initiates the connection between DSP and modem 70 and modem 40 on its own. Because DSP and modem 70 is acting without continual instruction from wireless link 160, wireless link 160 is available. The present invention makes use of this availability to provide the audible feedback feature.

As the initiation of a call from DSP and modem 70 to modem 40 begins, base station control processor 65 commands switch 90 to change position from what is shown in FIG. 2 such that the output of vocoder 75 is connected to wireless link 160 but the input from wireless link 160 is connected to DSP and modem 70. Within switch 90, the arrows indicate the direction of signal flow. When switch 90 is positioned as shown in FIG. 2, signals flow in both directions between wireless link 160 and DSP and modem 70. When the position of switch 90 is changed from what is shown, the output of vocoder 75 is connected to wireless link 160 but the input from wireless link 160 remains directed to DSP and modem 70.

Also as the initiation of a call from DSP and modem 70 to modem 40 begins, base station control processor 65 commands switch 95 to close such that the input of vocoder 75 is connected to analog signal 120. The vocoder encodes analog signal 120 and passes it over wireless link 160. Analog signal 120 carries the ringing or busy signal and any answer that might occur. If modem 40 successfully answers, DSP and modem 70 and modem 40 exchange a series of "handshaking" tones all of which are encoded by vocoder 75 and sent over wireless link 150.

By the time the connection is complete, base station control processor 65 must open switch 95 and change the position of switch 90 to connect DSP and modem 70 to wireless link 160 in both directions. The data connection between terminal equipment 10 and terminal equipment 50 is now complete and analog signal 120 is no longer monitored by vocoder 75.

Within mobile unit 60 a signal from wireless link 160 can be processed by either vocoder 200 or protocol stack 230 as chosen by mobile unit control processor 240. When a voice signal from the audible feedback feature arrives at mobile unit 60, it is decoded by vocoder 200 and out-put on speaker/microphone 260. Thus speaker/microphone 260 outputs a copy of analog signal 120 comprising modem tones from DSP and modem 70 and whatever signals are coming from telephone network 30.

Figure 5:
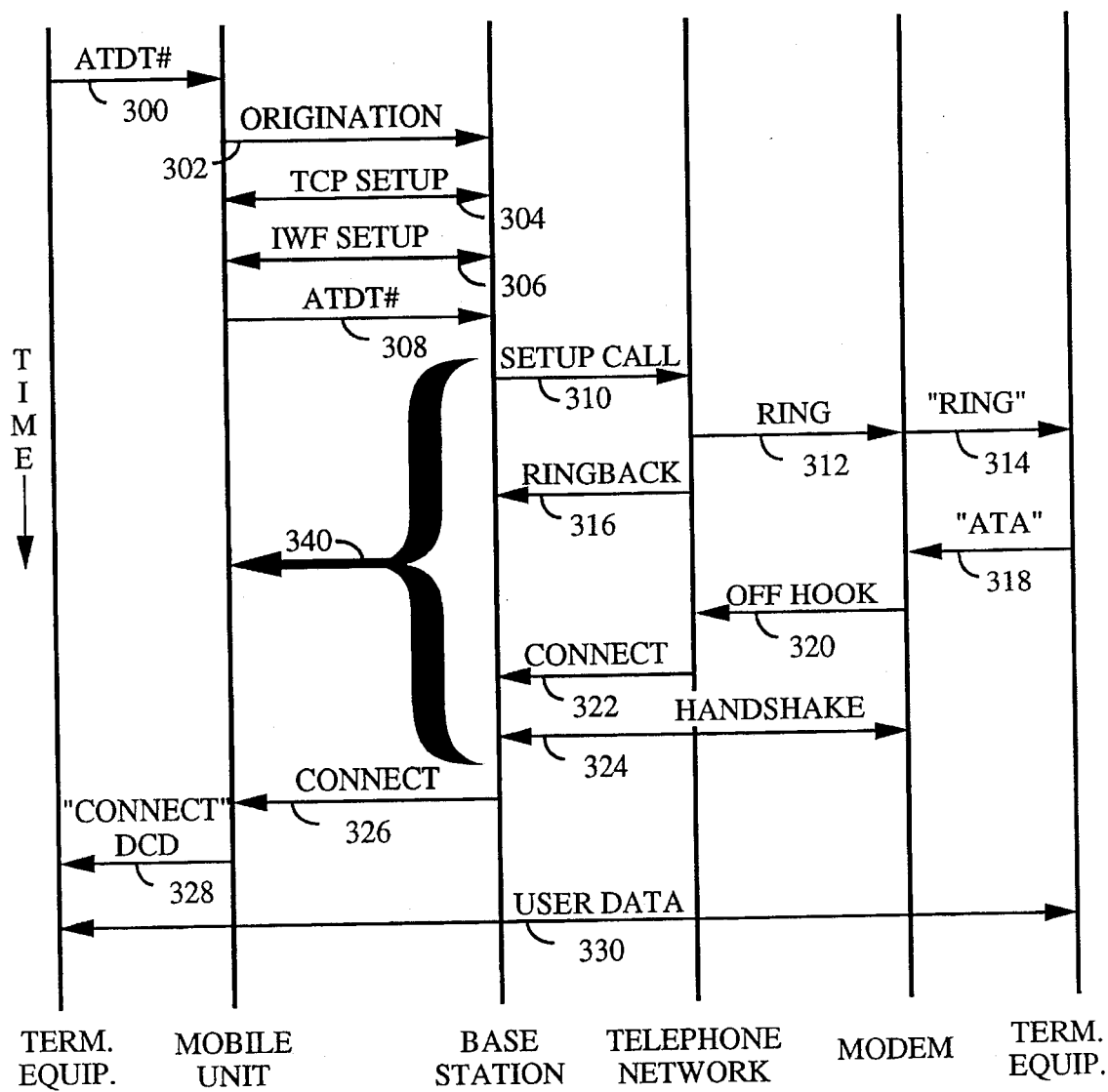
FIG. 5 shows an exemplary sequence of commands of a mobile unit initiated data connection including the audible feedback feature.

A more detailed description of a preferred embodiment of a mobile unit originated data call that can make use of the audible feedback feature is shown in FIG. 5. In FIG. 5, terminal equipment 10 initiates a call to terminal equipment 50 by issuing an ATDT command and the phone number of terminal equipment 50, command 300. This command is a standard command under the EIA/TIA/602 document entitled "Data Transmission Systems and Equipment—Serial Asynchronous Automatic Dialing and Control." Mobile unit 50 recognizes the command and initiates a wireless connection over the physical layer with base station 80 using standard Origination Message for transmission, command 302, with no called party number as described in EIA/TIA/IS-95 document entitled "Mobile Station—Base Station Compatibility Standard for Dual-Mode Wideband Spread Spectrum Cellular System."

Next mobile unit 60 sets the transfer protocol, command 304, to the TCP/IP standard, Internet RFC791, RFC792, and RFC793. The TCP/IP protocol suite provides several functions compatible with the transport layer and network layer. It provides flow control over the wireless link and facilitates inter-system operation and inter-operability with other wireless data systems. Next, mobile unit 60 sends the interworking function (IWF) setup, command 306. In a standard modem setup as shown in FIG. 1, each piece of terminal equipment has its own dedicated modem. In the present invention, modems are located in the base station and are accessible by a number of users. The user and terminal equipment may wish to fix a number of parameters within the modem that do not change between successive connections. These parameters are stored within mobile unit 60. Therefore with each new connection to base station 80, mobile unit 60 must restore these parameters to DSP and modem 70. Thus command 306 represents the exchange of any stored AT configuration commands between mobile unit 60 and DSP and modem 70.

At this point, DSP and modem 70 is ready to receive the original "ATDT#" command from mobile unit 60, command 308. DSP and modem 70 initiates a call to telephone network 30, command 310. Telephone network 30 sends the ring voltage to modem 40, command 312. Modem 40 informs terminal equipment 50 of the ring, command 314. In other embodiments, base station control processor 65, or other control agency within the base station, may receive the ATDT# command and perform call setup with telephone network 30.

A ring back indication is sent to DSP and modem 70, command 316. The ring back indications could be replaced with an out of service or busy indication, etc., if modem 40 were unavailable for communication.

Command 318 indicates that terminal equipment 50 has answered the call with TIA 602 protocol "ATA." If the modem 40 is in automatic answer mode, this command may not be needed. When modem 40 answers the line, the off hook indication is sent to telephone network 30, command 320. The connect signal indication is sent to base station 80, command 322.

The handshake tones between DSP and modem 70 and modem 40 are also an audible exchange and may be included in the audible feedback feature signal sent to mobile unit 60. The handshaking tones may comprise an echo canceling disable tone, an exchange sequence that sets a transfer data rate between the two modems, and a training sequence to test the selected data rate. The successful completion of the handshake also indicates that wireless link 160 is needed once again for digital information transfer. Switches 90 and 95 are returned to the original position such that DSP and modem 70 may communicate over wireless link 160.

From call setup to handshake or to call failure, analog signal 120 carries valuable information that the audible feedback feature provides to the user of terminal equipment 10. Also note that no other digital information processed by DSP and modem 70 passes over wireless link 160 during this time. Therefore, referring back to FIG. 2, switches 90 and 95 are positioned by base station control processor 65 to provide the audible feedback feature during this time or during a subset of this time. In FIG. 5, arrow 340 indicates the maximum period of the operation of the audible feedback feature. Arrow 340 represents the vocoded data taken from analog signal 120. At the completion of the handshaking, wireless link 160 is needed once more for digital information and the audible feedback feature must be turned off and switches 90 and 95 are returned to the positions shown in FIG. 2.

The connect indication, command 326, is passed over wireless link 160 to mobile unit 60. Mobile unit 60 informs terminal equipment 10 of the successful connection, command 328. The connection between terminal equipment 10 and terminal equipment 50 is complete and user data may be exchanged, command 330.

Figure 6:
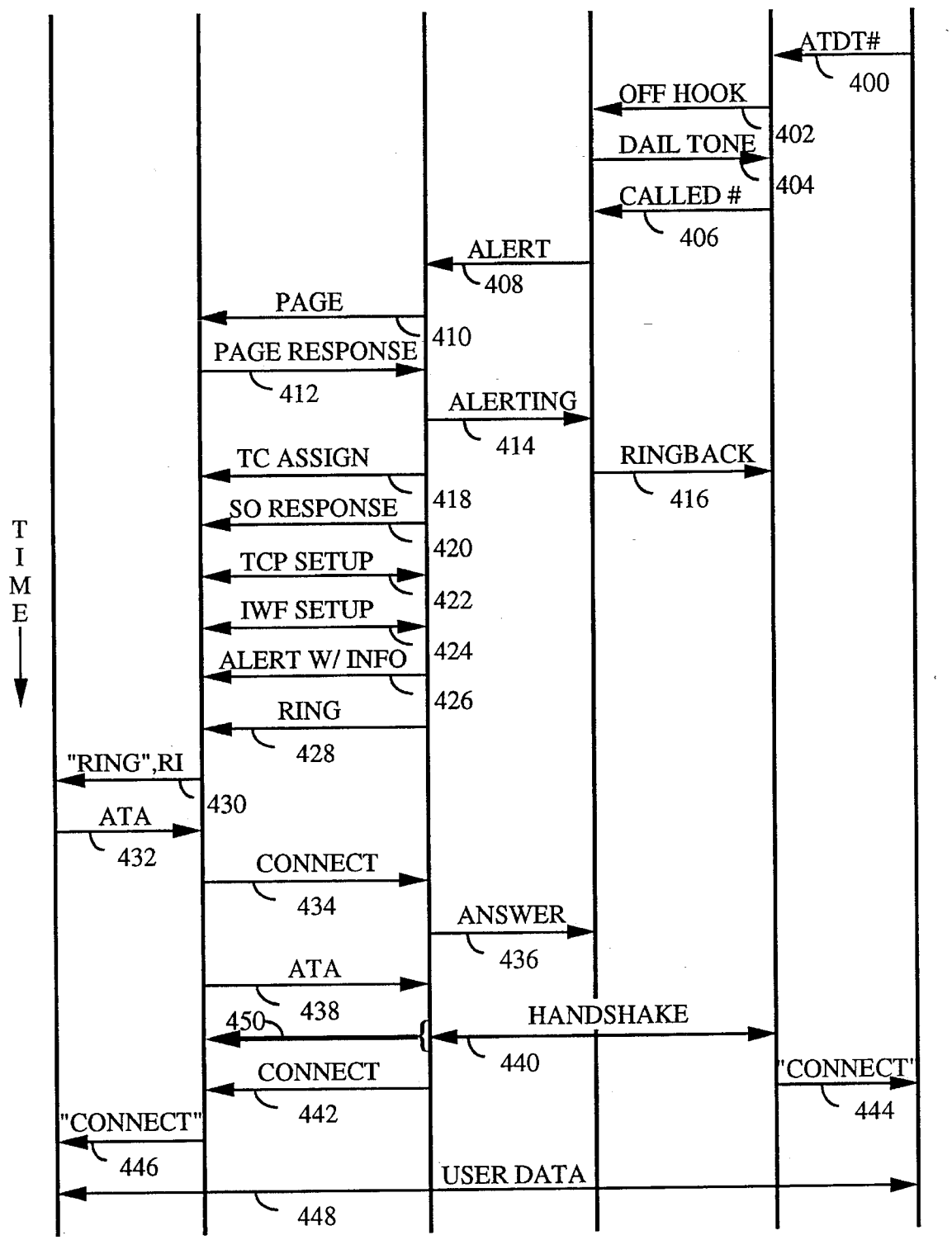
FIG. 6 shows an exemplary sequence of commands of a mobile unit terminated data connection including the audible feedback feature.

A similar set of commands is exchanged during a mobile terminated data call. FIG. 6 shows an exemplary exchange that can make use of the audible feedback feature. Terminal equipment 50 initiates the call by sending "ATDT#," command 400. Modem 40 goes off hook, command 402, and telephone network 30 provides the dial tone indication back to modem 40, command 404. Modem 40 provides the called number to telephone network 30, command 406. Telephone network 30 alerts base station 80 that a call as been received for terminal equipment 10 via mobile unit 60, command 408. Base station 80 pages mobile unit 60 according to IS-95, command 410. Mobile unit 60 replies to the page according to IS-95, command 412. Base station 80 alerts telephone network 30 that mobile unit 60 is present and available, command 414. Telephone network 30 provides a ringback indication to modem 40, command 416.

After the page response a series of communication takes place between base station 80 and mobile unit 60 according to IS-95. First a traffic channel is assigned and initialized, command 418. Next base station 80 informs mobile unit 60 of the service option type desired, command 420. Base station 80 and mobile unit 60 exchange TCP setup information, command 422. Next base station 80 and mobile unit 60 exchange interworking functions (IWF) setup information, command 424, to set up DSP and modem 70 in the manner that terminal equipment 10 has specified in the past.

After the setup stages, the alert with information signal is passed from base station 80 to mobile unit 60, command 426, designating the manner in which mobile unit 60 should alert the user. Next base station 80 commands mobile unit 60 to periodically issue the ring result code to terminal equipment 10, command 428.

At this point, mobile unit 60 notifies terminal equipment 10 for the first time in the sequence that an incoming call is present by sending "RING", RI, command 430. Terminal equipment 10 may issue the ATA command which directs mobile unit 60 to answer the call. This command may not be necessary if auto answer mode is activated. The connection message is sent from mobile unit 60 to base station 80, command 434, and the answer message is sent from base station 80 to telephone network 30, command 436. The ATA command is now forwarded to base station 80 from mobile unit 60, command 438.

Having established the connection, the handshaking mechanism can take place between base station 80 and modem 40. It is this portion of the connection sequence that may provide important audible information to the user of terminal equipment 10. Thus during this period the audible feedback feature is activated, arrow 450. As with the mobile initiated call, base station control processor 65 commands switch 90 to change position from what is shown in FIG. 2 such that the output of vocoder 75 is connected to wireless link 160. At the same time, base station control processor 65 commands switch 95 to close such that the input of vocoder 75 is connected to analog signal 120. At the completion of the handshake this audible feedback feature can be deactivated and switches 90 and 95 are reset to the configuration of FIG. 2.

After the handshake is complete, modem 40 issues "connect" to terminal equipment 50, command 444. Base station 80 issues the connection command to mobile unit 60 which in turn issues the connect command to terminal equipment 10, commands 442 and 446 respectively. The connection between terminal equipment 10 and terminal equipment 50 is complete and user data may be exchanged, command 448.

Mobile unit 60 in FIGS. 2 and 3 may be capable of simultaneous voice and data communications. This feature allows the end user to communicate using a voice connection while also communicating over a data connection. Thus several methods must be developed to address the situation where a data connection is initiated while a voice connection is in progress. The use of a digital wireless system for simultaneous voice and data service is disclosed in U.S. patent application Ser. No. 08/152,162 entitled "METHOD OF INVOKING AND CANCELING VOICE OR DATA SERVICE FROM A MOBILE UNIT," filed Nov. 15, 1993, and assigned to the assignee of the present invention, the disclosure thereof incorporated by reference.

One method of dealing with data connection initiation during an active voice connection is to automatically disable the audible feedback feature. Audible feedback feature may be a feature requested by the mobile unit. If the mobile unit is involved in a voice call, the request from the mobile unit at initiation of the call could be omitted. If the call is a mobile unit terminated call, the audible feedback feature signal could be disregarded by the mobile unit. This method could be enabled and disabled by the mobile unit user.

A second method of dealing with data connection initiation during an active voice connection is to momentarily disable the incoming voice connection. In this case, the audible feedback feature signal would momentarily interrupt the bi-directional voice communication and insert the audible feedback feature tones. This method could be enabled and disabled by the mobile unit user.

A third method of dealing with data connection initiation during an active voice connection is to digitally add the returning signals before providing them to the vocoder in the mobile unit. Thus the mobile unit user would continue to carry on his voice connection and hear the audible feedback feature tones in the background. The relative level of the actual voice connection and the audible feedback feature could be set by the user. This method could be enabled and disabled by the mobile unit user.

One advantage of the audible feedback feature is that if a human answers a mobile unit initiated call, the mobile unit user is able to hear the answer. When a human answers, the mobile unit user may wish to speak to the answerer. If the mobile unit is capable of providing voice services, such as shown in FIG. 3, the service option of the call can be transitioned from data to voice. Several methods are available for signaling such a transition.

If the mobile unit is not involved in an active voice call, the mobile unit user may simply lift the handset to transition the call. Alternatively the user may be provided with a keypad interface as shown in FIG. 3. In FIG. 3, keypad 270 provides a mobile unit user interface to mobile unit 60. Keypad 270 provides switch 275 that indicates whether the present entry made on keypad 270 is directed toward a voice connection or a data connection. If the user wishes to transition the present data connection to a voice connection then he may set switch 275 to the data indication and press the send key. A variety of other entry methods may be used to indicate the transition including dedicated keys, soft menu selection, conditional dependence of multiple functioning keys, and voice activation.

Once an indication of the desire to change the service option of the active call is generated by mobile unit 60 and communicated to base station 80, base station control processor 65 can route the call through vocoder 85. An additional feature might be added to return the voice connection into a data connection in much the same manner. During the period of the voice connection, DSP and modem 70 can be free to be assigned to another incoming call. Alternatively DSP and modem 70 could wait to be freed for some period of time to see if the call is transitioned back to a data call thus saving the IWF setup.

It is also foreseeable that mobile units would be available that do not provide voice capabilities. Such a wireless data unit may be coupled to a terminal equipment that has the decoding portion of a vocoder and a speaker. A common application of such a device would be a dedicated digital wireless FAX machine which incorporates the mobile unit data connection functions.

Figure 4:
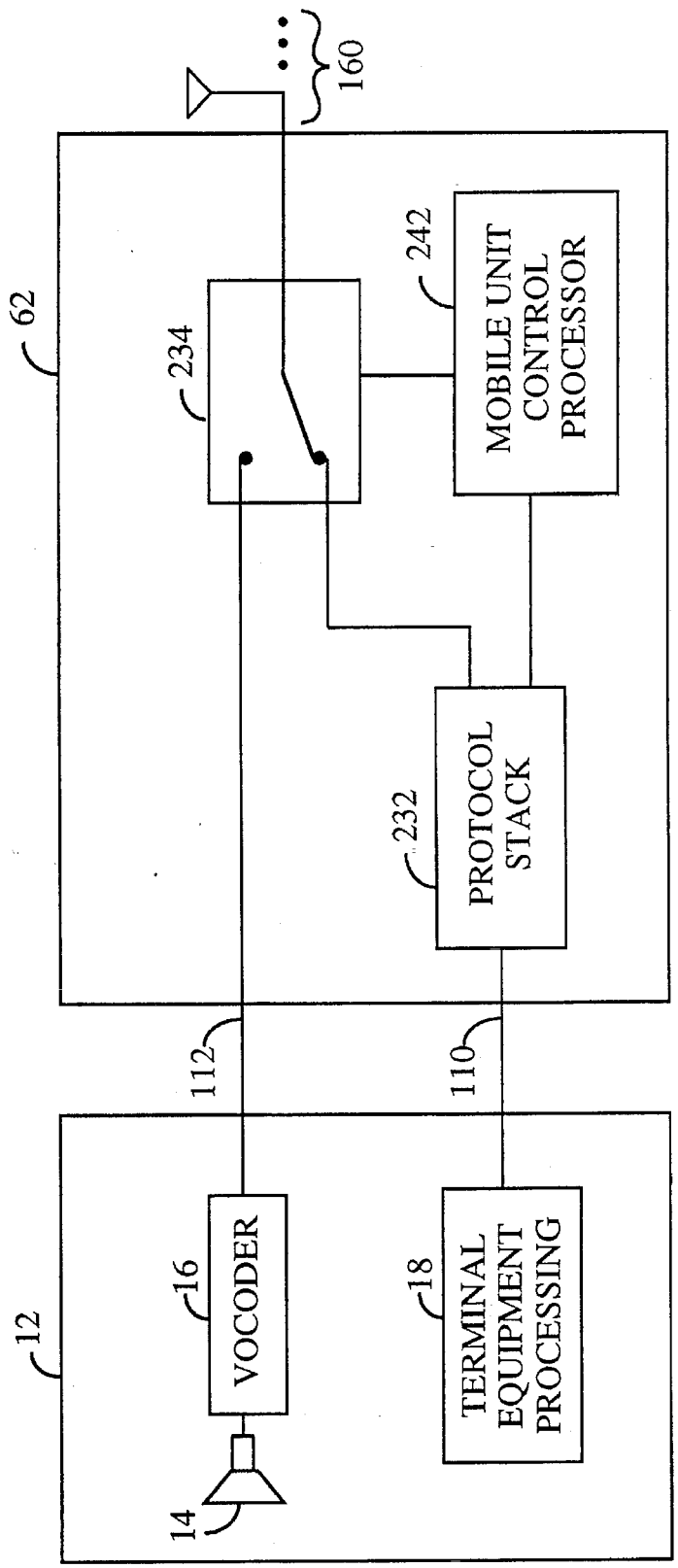
FIG. 4 shows an exemplary configuration of a mobile unit capable of providing data communication over a wireless link.

FIG. 4 represents a configuration with wireless data unit 62 and terminal equipment 12 with speaker. These two elements would directly replace mobile unit 60 and terminal equipment 10 of FIG. 2 respectively. Referring to FIG. 4, during normal data operation, switch 234 is set as shown in FIG. 4 under the control of mobile unit control processor 242, which performs analogous functions as mobile unit control processor 240 of FIG. 3. Signals from wireless link 160 are directed to protocol stack 232 that performs analogous functions as protocol stack 230 of FIG. 3. Protocol stack 232 passes digital data 110 to terminal equipment 12. When a packet of audible feedback feature data arrives from the base station, mobile unit control processor 242 changes the position of switch 234 to connect wireless link 160 to vocoder 16. Vocoder 16 decodes the audible feedback feature data on audible feedback feature data 112 and provides the corresponding audible signal to speaker 14. To reduce the cost of the speaker assembly, vocoder 16 need only provide the decoding function and does not need to provide the more complicated encoding mechanism. Additionally the speaker quality would not have to be great thus the audible feedback feature could be provided with relatively inexpensive equipment.

Note that in the configuration of FIG. 4, terminal equipment 12 receives digitally encoded voice signals on audible feedback feature data 112. Additional memory may be added to terminal equipment 12 such that audible feedback feature data 112 may be captured and stored. Captured digital voice data could be recalled and output on speaker 14 or it may be transmitted over wireless link 160. Thus the hardware needed for the audible feedback feature could be used as an electronic mail system.

The configuration of FIG. 4 provides the same information to the user as the dual capability set up in FIG. 3. Obviously, the configuration in FIG. 4 does not allow the data connection to be transferred to a voice connection because voice functionality is not included in wireless data unit 62. Also FIGS. 2 and 3 might be combined with FIG. 4 in a hybrid such that the speaker in the terminal equipment is used in conjunction with a mobile unit that provides voice service.

The application of the audible feedback feature is particular well suited for implementation in Personal Digital Assistants (PDA). APDA may provide complete portable wireless voice and data communication, and personal computing capabilities. APDA could have a configuration similar to that shown in FIG. 4 contained in one housing. An alternative PDA configuration may include the additional elements of FIG. 3 within the housing to provide full voice capabilities.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of providing an audible feedback feature to a first terminal equipment user during communication or attempted communication between said first terminal equipment and a second terminal equipment using a mobile unit and a base station each capable of digital wireless communications, and a telephone network capable of passing audible tones, and a modem capable of communications with audible tones, said method comprising the steps of:

initiating a connection from said first terminal equipment to said second terminal equipment by passing a connection initiation message from said first terminal equipment to said mobile unit;

passing to said base station by said mobile unit a first digitally encoded message containing a telephone number associated with said second terminal equipment;

decoding said digitally encoded message by said base station and providing a first audible tone message to said telephone network;

vocoding by said base station said first audible tone message to produce a digital feedback message and providing said digital feedback message to said mobile unit; and decoding said digital feedback message at said mobile unit and providing said first audible tone message to said first terminal equipment user.

2. The method of claim 1 further comprising the steps of:

passing a second audible tone message from said telephone network to said base station;

vocoding by said base station said second audible tone message to produce a second digital feedback message and providing said second digital feedback message to said mobile unit; and decoding said second digital feedback message at said mobile unit and providing said second audible tone message to said first terminal equipment user.

3. The method of claim 2 wherein said first audible tone message comprises a call setup message.

4. The method of claim 2 wherein said second audible tone message comprises a dial tone.

5. The method of claim 2 wherein said second audible tone message comprises a ring back indication.

6. The method of claim 2 wherein said second audible tone message comprises a busy tone indication.

7. The method of claim 2 wherein said second audible tone message comprises a human voice signal.

8. The method of claim 1 further comprising the steps of:

passing a third audible tone message from said modem to said telephone network;

passing said third audible tone message from said telephone network to said base station;

vocoding by said base station said third audible tone message to produce a third digital feedback message and providing said third digital feedback message to said mobile unit; and decoding said third digital feedback message at said mobile unit and providing said third audible tone message to said first terminal equipment user.

9. A method of providing audio feedback to a terminal equipment user in a wireless system supporting distinct data and voice connections, said data connections for carrying data information and said voice connections for carrying voice information, comprising the steps of:

creating at a first terminal equipment a command to initiate a data connection with a second terminal equipment;

initiating by a first wireless communication unit a data connection with a digital data modem in a remote base station over a wireless link;

initiating by said digital data modem a landline telephone call over a telephone network by creating of a series of audible tones;

vocoding said series of audible tones at said remote base station;

transmitting over said wireless link said vocoded series of audible tones to said wireless communication unit; and decoding said vocoded series of audible tones and producing an audible copy of said series of audible tones.

10. The method of providing audio feedback of claim 9 wherein said first terminal equipment and said first wireless communication unit are one functional unit and wherein said first wireless communication unit comprises a dedicated speaker for producing said audible copy of said series of audible tones.

11. The method of providing audio feedback of claim 9 wherein said first wireless communication unit is capable of simultaneous use of said data connection and said voice connection and wherein said first wireless communication unit comprises a dedicated speaker for producing said audible copy of said series of audible tones.

12. The method of providing audio feedback of claim 9 wherein said first wireless communication unit is capable of simultaneous use of said data connection and said voice connection and wherein said first wireless communication unit comprises a single speaker for producing said audible copy of said series of audible tones and a voice connection audible signal simultaneously.

13. The method of providing audio feedback of claim 9 wherein said first wireless communication unit is capable of simultaneous use of said data connection and said voice connection and wherein said first wireless communication unit comprises a single speaker for producing said audible copy of said series of audible tones and a voice connection audible signal and wherein said voice connection audible signal is paused for the duration of said audible copy of said series of audible tones.

14. A method of providing audio feedback to a terminal equipment user in a wireless system supporting distinct data and voice connections, said data connections for carrying data information and said voice connections for carrying voice information, comprising the steps of:

creating at a first terminal equipment a command to initiate a data connection with a second terminal equipment;

initiating by a first wireless communication unit in response to said command a data connection with a digital data modem in a remote base station over a wireless link;

initiating by said digital data modem a landline telephone call over a telephone network;

receiving at said remote base station from said telephone network a series of audible tones;

vocoding said series of audible tones at said remote base station;

transmitting over said wireless link said vocoded series of audible tones to said wireless communication unit; and decoding at said first wireless communication unit said vocoded series of audible tones and producing an audible copy of said series of audible tones.

15. The method of providing audio feedback of claim 14 wherein said series of audible tones is created by said telephone network.

16. The method of providing audio feedback of claim 15 wherein said audible copy of said series of audible tone indicates a busy tone and said landline telephone call has failed to be established and said data connection is abandoned by a user of said first terminal equipment.

17. The method of providing audio feedback of claim 14 wherein said series of audible tones is created by said second terminal unit and is conveyed by said telephone network to said remote base station.

18. The method of providing audio feedback of claim 17 wherein said audible copy of said series of audible tone is a handshaking sequence and includes signals from said digital data modem.

19. The method of providing audio feedback of claim 18 wherein said handshaking sequence indicates successful initiation of said data connection with said second terminal equipment and whereupon said step of vocoding said series of audible tones is terminated further comprising the step of transmitting by said digital data modem over said wireless link a series of digital data created by said digital data modem from said series of audible tones from said second terminal equipment.

20. The method of providing audio feedback of claim 14 wherein said series of audible tones is a voice and is conveyed by said telephone network to said remote base station.

21. The method of providing audio feedback of claim 20 further comprising the step of transistioning said initiated data connection to a new voice connection.

22. A method of providing audio feedback to a terminal equipment user in a wireless system supporting distinct data and voice connections, said data connections for carrying data information and said voice connections for carrying voice information, comprising the steps of:

sending from at a first terminal equipment a command to initiate a data connection with a second terminal equipment wherein said second terminal equipment communicates through a wireless link;

providing by said first terminal equipment over a telephone network a series of audible tones to a base station;

initiating by said base station a wireless connection to said second terminal equipment by transmission of digital data produced by a digital data modem within said base station;

receiving at said base station from said second terminal equipment an indication of successful connection over said wireless link with said second terminal equipment;

providing by said digital data modem and said first terminal equipment modem over said telephone network a second series of audible tones comprising handshaking tones therebetween; and vocoding said second series of audible tones at said base station;

transmitting over said wireless link said vocoded second series of audible tones to said second terminal equipment.

23. A wireless system providing audio feedback, comprising:

a first terminal equipment unit producing a standard stream of digital data and processing a receive stream of standard digital data;

a mobile unit comprising:

a protocol stack receiving said stream of standard digital data and encoding said stream of standard digital data for transmission over a wireless link, and receiving an encoded stream of digital data, decoding said encoded stream of digital data to produce said receive stream of standard digital data and passing said receive stream of standard digital data to said first terminal unit;

a speaker/microphone producing an audible output signal;

a vocoder receiving encoded audible data from said wireless link; and a control processor directing an information signal received from said wireless link to said protocol stack or to said vocoder dependent upon whether said information signal comprises encoded audible data or digital data;

a base station comprising:

a digital signal processor and modem receiving said encoded stream of standard digital data for transmission over said wireless link from said protocol stack and producing an audible signal in response thereto and passing said audible signal to a telephone network and intermittently passing said audible signal to a vocoder, and receiving an audible signal from a telephone network, said audible signal from said telephone network comprising data and audible information signals; and a vocoder intermittently encoding said audible signal from said digital signal processor and modem and audible signal from said telephone network and passing encoded signals over said wireless link only when said digital signal processor and modem is not passing an information signal over said wireless link;

wherein said vocoder and speaker/microphone in said mobile unit provides an audible signal in response to said encoded signals passed over said wireless link by said vocoder in said base station.

24. The wireless system providing audio feedback of claim 23 wherein said audible information signals originate from a remote telephone.

25. The wireless system providing audio feedback of claim 24 wherein said audible information signals are a human voice.

26. The wireless system providing audio feedback of claim 23 wherein said audible information signals originate from said telephone network.

27. The wireless system providing audio feedback of claim 26 wherein said audible information signals comprise a busy indication.

28. The wireless system providing audio feedback of claim 23 wherein said data signals originate from a remote terminal equipment unit.

29. A method of providing audio feedback in a wireless based modem configuration comprising the steps of:

sending from a first terminal unit to a wireless communication unit a request to establish a data connection with a second terminal unit associated with a telephone number;

sending from said wireless communication unit to a base station a message to originate a wireless data connection;

sending from said wireless communication unit to said base station a message to initialize a modem within said base station;

sending from said wireless communication unit to said base station a message comprising said telephone number;

sending from said base station to a telephone network an audible signal to set up a call;

vocoding at said base station said audible signal to set up said call and sending a corresponding encoded audio signal to said wireless communication unit.

30. The method of providing audio feedback in a wireless based modem configuration of claim 29 further comprising the steps of:

sending from said telephone network to a remote modem a ring indication;

sending from said remote modem to said second terminal equipment a corresponding ring indication;

sending from said telephone network to said base station a ringback indication; and vocoding at said base station said ringback indication and sending a corresponding encoded audio signal to said wireless communication unit.

31. The method of providing audio feedback in a wireless based modem configuration of claim 29 further comprising the steps of:

sending from said second terminal equipment to a remote modem an on-line indication;

sending from said remote modem to said telephone network an off hook indication;

sending from said telephone network to said base station a connect indication; and vocoding at said base station said connect indication and sending a corresponding encoded audio signal to said wireless communication unit.

32. The method of providing audio feedback in a wireless based modem configuration of claim 29 further comprising the steps of:

sending from said telephone network to said base station a first series of handshaking signaling;

sending from said base station to said telephone network a second series of handshaking signaling; and vocoding at said base station said first and second series of handshaking signaling and sending a corresponding encoded audio signal to said wireless communication unit.

33. A method of providing audio feedback in a wireless based modem configuration comprising the steps of:

sending from a first terminal unit to a wireless communication unit a request to establish a data connection with a second terminal unit associated with a telephone number;

sending from said wireless communication unit to a base station a message to originate a wireless data connection;

sending from said wireless communication unit to said base station a message to initial a modem within said base station;

sending from said wireless communication unit to said base station a message comprising said telephone number;

sending from said base station to a telephone network an audible signal to set up a call;

sending from said telephone network to a remote unit a ring indication;

sending from said telephone network to said base station a busy indication; and vocoding at said base station said busy indication and sending a corresponding encoded audio signal to said wireless communication unit.

34. A method of providing audio feedback in a wireless based modem configuration comprising the steps of:

sending from a first terminal unit to a wireless communication unit a request to establish a data connection associated with a telephone number;

sending from said wireless communication unit to a base station a message to originate a wireless data connection;

sending from said wireless communication unit to said base station a message to initialize a modem within said base station;

sending from said wireless communication unit to said base station a message comprising said telephone number;

sending from said base station to a telephone network an audible signal to set up a call;

sending from said telephone network to a telephone a ring indication;

sending from said telephone network to said base station a ringback indication;

sending from said telephone to said telephone network a human voice signal;

sending from said telephone network to said base station said human voice signal; and vocoding at said base station said human voice signal and sending a corresponding encoded audio signal to said wireless communication unit.

* * * * *